May 14, 1963

A. S. JENKINS ETAL 3,089,686

FLAME TREATING APPARATUS

Filed July 13, 1960

INVENTORS
ALBERT S. JENKINS
RAYMOND A. ATKINSON
BY
J. Ralph Hoge
J. F. Teigland
ATTORNEYS

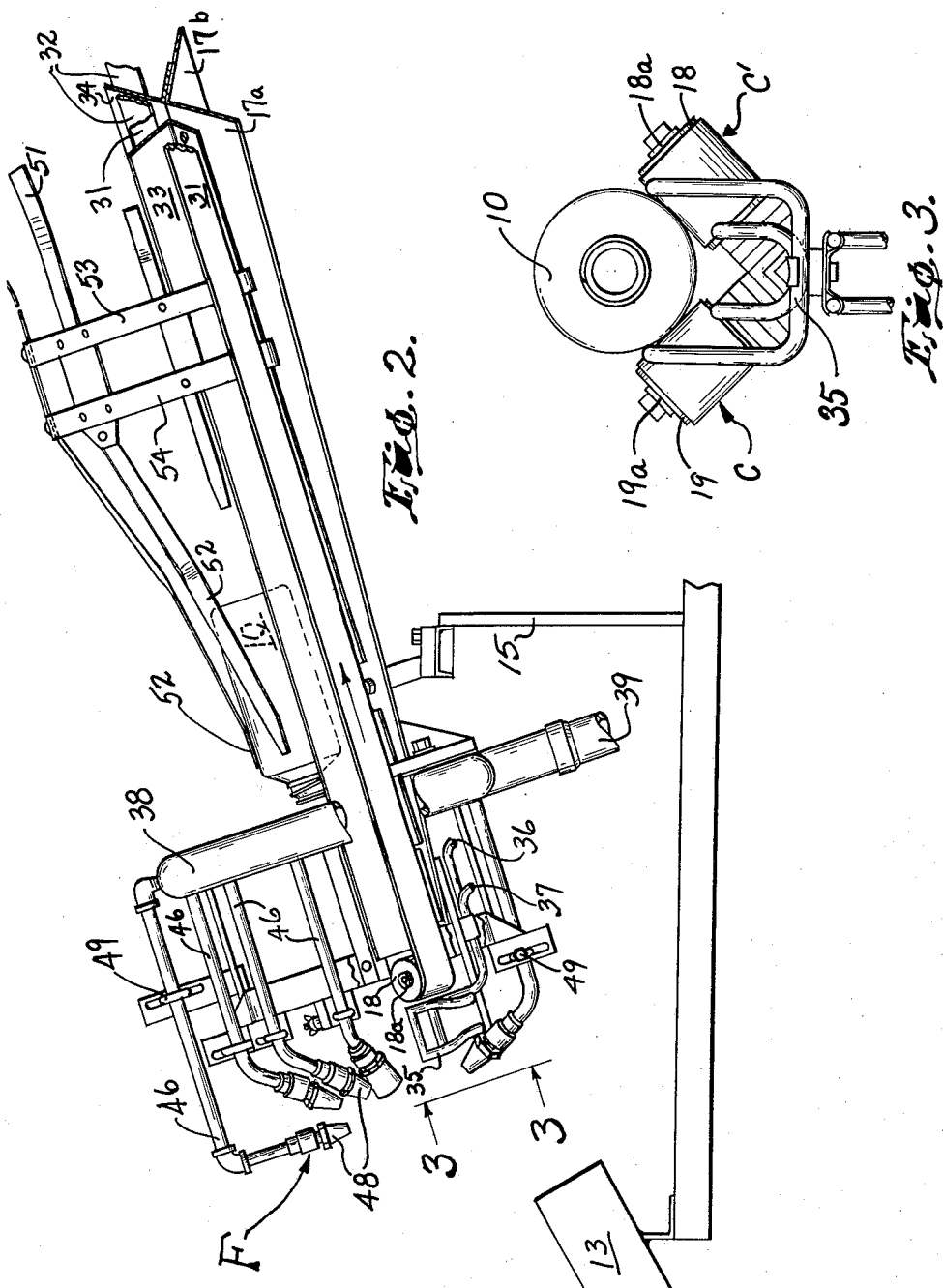

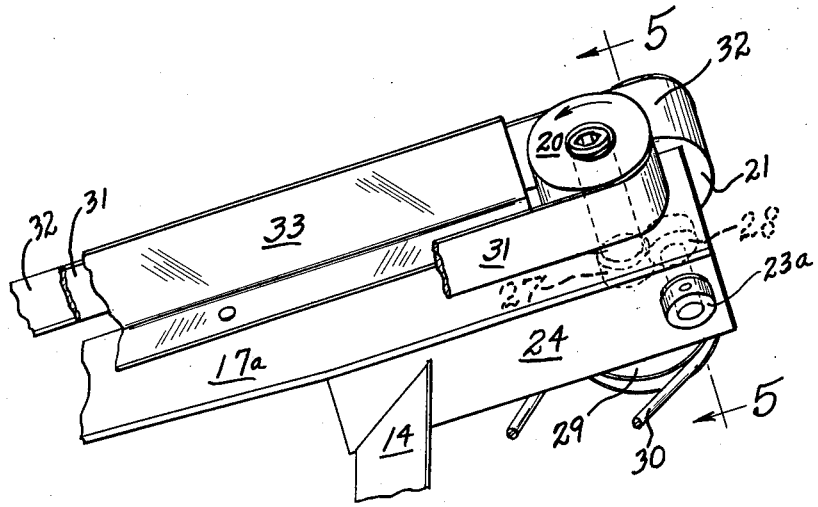
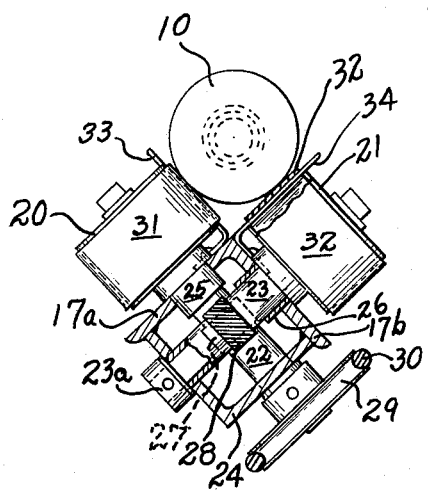
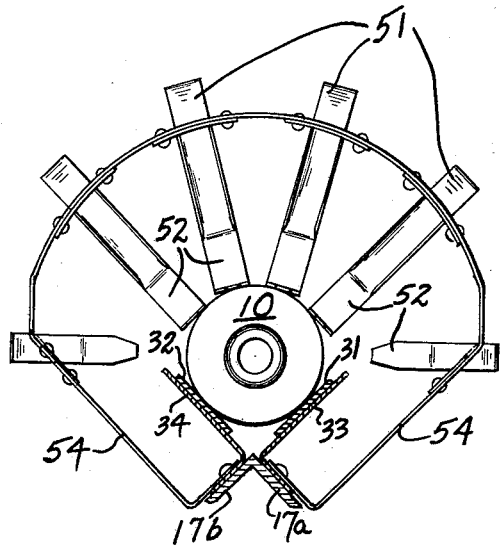
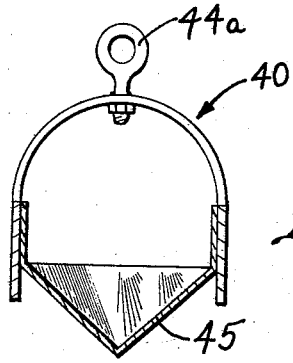

United States Patent Office 3,089,686
Patented May 14, 1963

3,089,686
FLAME TREATING APPARATUS
Albert S. Jenkins and Raymond A. Atkinson, Toledo, Ohio, assignors to Owens-Illinois Glass Company, a corporation of Ohio
Filed July 13, 1960, Ser. No. 42,707
9 Claims. (Cl. 263—6)

This invention relates generally to flame treating apparatus, and more particularly to apparatus for flame treating the exterior surfaces of blown plastic containers.

Plastic articles, particularly articles blown or molded from polyethylene or polystyrene, possess a common characteristic, that is, printing inks and adhesives will not satisfactorily adhere to their surfaces. Accordingly, it is necessary to treat these articles so as to alter their surface characteristics. This treatment consists of very briefly exposing the surfaces to be treated to a high intensity gas flame. Although some latitude is allowable, the amount of exposure must be regulated within certain limits. Too little exposure results in ineffective treatment; too much exposure can damage the articles.

To treat certain plastic articles, such as containers which are symmetrical about a central axis, it has been found desirable to provide a continuous circular ring of high intensity gas flames and pass the containers through the center of this ring. There are two main problems which exist in providing apparatus which is inexpensive and which is capable of high speed operation. The first problem is that of controlling the length of time the containers are exposed to the high intensity gas flames. The second problem is that of accurately guiding the containers through the center of the ring of flames so that the exterior surfaces of the container will be uniformly exposed. These problems are further intensified by the fact that the blown plastic containers are relatively light, and hence not easily guided.

Accordingly, it is an object of our invention to provide relatively simple, inexpensive apparatus for flame treating the exterior surface of plastic containers.

Another object of our invention is to provide apparatus for accurately passing a symmertical plastic container through the center of a circular ring of high intensity gas flames.

A still further object of our invention is to provide apparatus, capable of high speed operation, for uniformly exposing the exterior surfaces of a plastic container to high intensity gas flames and controlling the length of exposure.

The specific nature of this invention, as well as other objects and advantages thereof, will become apparent to those skilled in the art from the following detailed description taken in conjunction with the annexed sheets of drawings, on which, by way of example only, the preferred embodiment of this invention is illustrated.

In the drawings:

FIG. 2 is an enlarged elevational view showing the discharge end of the flame treating apparatus;

FIG. 3 is an enlarged end elevational view taken along the line 3—3 of FIG. 2;

FIG. 4 is an enlarged elevational view partly in section showing the article receiving end of the flame treating apparatus with the transfer chute removed therefrom;

FIG. 5 is a sectional elevational view taken along the line 5—5 of FIG. 4, showing the drive mechanism of the flame treating apparatus;

FIG. 6 is a sectional view taken along the line 6—6 of FIG. 1, showing a container held in position by the container guide; and FIG. 7 is a sectional view taken along the line 7—7 of FIG. 1.

Figure 1:
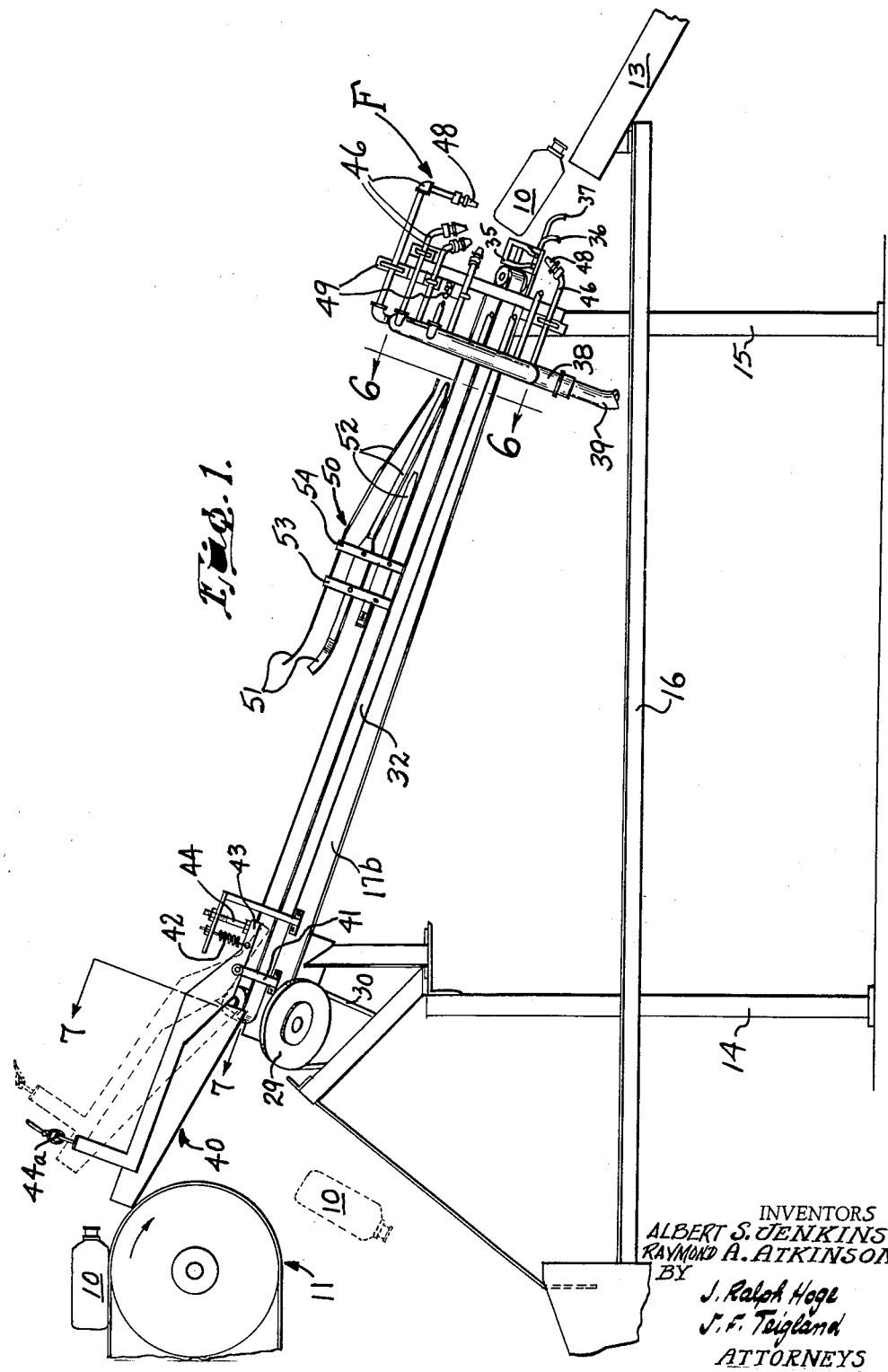
FIG. 1 is a side elevational view of the preferred embodiment of the flame treating apparatus of our invention.

Referring now to FIG. 1, plastic containers 10 are delivered in either a recumbent position (as shown) or an upright position by endless conveyor 11 to a transfer chute 40. From the transfer chute, the containers pass by gravity to an inclined channel or trough-like guide formed by two parallel, longitudinally and transversely inclined conveyors C and C' which are arranged to form a V-shaped inclined valley or channel (see FIG. 3). The conveyors direct the containers downwardly at a desired rate of speed. Upon being discharged from the exit or lower end of the inclined channel, the containers begin a predetermined trajectory, and pass through the center of a ring of high intensity gas flames which is positioned concentric with and normal to the trajectory of the containers. The flame treated containers continue on to a receiver 13. A container guide 50 and a discharge guide 35 are also provided to further aid in guiding the containers accurately through the center of the ring of flames.

The inclined channel for the flame treating apparatus, in its preferred form, comprises two parallel, inclined conveyors C and C' which are adapted to receive the containers and accurately guide and convey them downwardly at a controlled rate of speed and discharge them along a predetermined trajectory. The supporting structure for the flame treating apparatus comprises two vertical support members 14 and 15 and a horizontal member 16. The vertical support members are of unequal height. A channel member 17, which has two legs 17a and 17b disposed normal to each other, is secured in an inclined position to the upper ends of the two vertical support members 14 and 15. The channel member 17 comprises a main support for the two previously mentioned parallel, channel- or trough-forming inclined conveyors C and C'.

The conveyors C and C' comprise take-up pulleys 18 and 19, drive pulleys 20 and 21, endless belts 31 and 32, and carrying supports 33 and 34, respectively. At the lower end of the channel member 17 are rotatably mounted two pulleys 18 and 19 which constitute the take-up pulleys for the conveyors. The take-up pulleys, rotatably mounted on shafts 18a and 19a, respectively, are positioned normally and are secured to the legs 17a and 17b, respectively, of the channel member 17.

At the upper end of the channel member 17 (FIGS. 4 and 5) are two pulleys 20 and 21, which constitute the drive pulleys for the conveyors. The drive pulleys 20 and 21 are attached to drive shafts 22 and 23, respectively, which extend through and normal to respective legs of the channel member 17, and through a second channel member 24 (FIG. 5) which is attached in an inverted position to the first mentioned channel member 17 to form a square beam structure. The drive pulleys 20 and 21 are mounted so that their respective drive shafts 22 and 23 are longitudinally offset (FIG. 4). The drive shafts are journaled in bearings 25 and 26 mounted in the two channel members 17 and 24. Drive shaft 23 is maintained in place by a collar 23a which is pinned to the lower end thereof. The other drive shaft 22 is maintained in place by a pulley wheel 29 which is pinned to the lower end thereof. The drive shafts 22 and 23 carry meshing screw gears 27 and 28, respectively, which are located intermediate the ends of the drive shafts. The drive shafts and their respective gears are so mounted that rotation of one of the shafts also rotates the other shaft. A belt 30 connects the pulley wheel 29 to a conventional variable speed drive (not shown) which may comprise a variable speed electric motor.

Endless belts 31 and 32 are trained over the drive pulleys 20 and 21 and take-up pulleys 18 and 19, respectively. Carrying supports 33 and 34 are secured to the channel member intermediate respective drive and take-up pulleys, and are positioned to support the upper reaches of the belts 31 and 32 in the load bearing portion of their path of travel. The two parallel, inclined conveyors C and C' are thus disposed normal to each other and form a V-shaped channel for accurately conveying and guiding the containers.

The transfer chute 40 (FIG. 1) is located at the upper or receiving end of the conveyors and is pivotally mounted at its lower end on a supporting bracket 41 which is rigidly secured to the channel member 17. The transfer chute is spring-biased, by means of an extension spring 42 which maintains the extreme lower end 43 of the transfer chute against a stop 44 which is also rigidly secured to the channel member 17. In its normal position the transfer chute receives containers from the endless conveyor 11 and transfers them in a recumbent position to the upper receiving end of the inclined guide. To transfer the containers in a recumbent position, the transfer chute 40 is provided with a V-shaped bottom 45 (FIG. 7). The transfer chute may be lifted at 44a by the operator to allow containers to bypass the flame treating zone if it is clogged, under repair, or for other obvious reasons.

A discharge guide 35, associated with the flame treater (FIGS. 1, 2 and 3) and comprising a series of heat resistant tubes bent and arranged to guide misaligned containers, is located adjacent the lower or discharge end of the container channel. The tubes, which are bent to form two pairs of parallel guides are hollow, and water or some other cooling medium is circulated through the tubes to keep them cool. The cooling medium, which enters at 36 and leaves at 37 may be supplied by any conventional means (not shown). The guide 35, which is positioned to contact only containers which are not following the desired trajectory, deflects misaligned containers so that they will pass through the center of the ring of flames.

Adjacent the discharge guide 35 is located the flame treating means F which is adapted to provide a continuous circular ring of high intensity gas flames which is concentric with and normal to a portion of the trajectory of the containers. The flame treating means comprises a circular manifold 38 (FIGS. 1 and 2) having a supply entrance 39 to which is fed a combustible air-gas mixture under pressure from conventional means (not shown). A plurality of gas pipes 46 extends longitudinally and then radially inwardly relative to the manifold. The gas pipes carry at their outer ends burners 48 which are positioned to direct a flame at an imaginary center, which in operation of the apparatus corresponds to the central axis of a container passing through the ring of flames. The burners 48 and gas pipes 46 which are supported by adjustable brackets 49, are circumferentially spaced apart and arranged to provide a continuous ring of high intensity gas flames which, as explained above, is concentric with and normal to the path taken by the containers as they are discharged from the conveyors. The burners 48 are slightly inclined in a forward direction so that no burner points at another burner, thereby preventing the burners from burning each other up.

Spaced upwardly from the heat treating zone is a container guide 50 which is adapted to position the containers against the conveyor belts 30 and 31 (see FIG. 6) and operates to eliminate any lateral movement of the containers as they approach the heat treating zone. Since the containers are relatively light, they frequently tend to bounce around when they are acted upon by the conveyors, especially if they are not in perfect alignment when they are deposited on the conveyors. The container guide comprises a plurality of circumferentially spaced spring-like fingers 51 which overlie the path of the containers and whose forward ends 52 slope down to lie just above the path of the containers. The spring-like fingers 51 are secured to two supporting frames 53 and 54 which are spaced radially outwardly from and partially encircle the path of travel of the containers. The supporting frames 53 and 54 are rigidly secured to the channel member 17.

In operation, symmetrical containers 10 in either an upright or recumbent position are delivered by an endless conveyor 11 to the pivotally mounted transfer chute 40. The transfer chute as stated previously may be raised to bypass the containers or it may be left in its normal position to transfer the containers in a recumbent position, to the two parallel and inclined conveyors C and C'. Upon being propelled by gravity into the V-shaped channel formed by the two conveyors C and C', the containers are acted upon by the conveyors and are moved downwardly toward the flame treating zone at a desired rate of speed. Prior to reaching the flame treating zone, the containers are impinged by the spring-like fingers 51 of the container guide 50 which position them against the conveyors and prevent them from having any lateral movement as they approach the flame treating zone. The containers are discharged from the conveyors along a predetermined trajectory. As the containers move along this trajectory they pass through the center of a circular ring of high intensity gas flames which is positioned concentric with and normal to a portion of the trajectory.

To insure uniform treatment of the containers, we have found that it is desirable to incline the conveyors at an angle of about 20° from the horizontal. This is necessitated by the relatively lightweight of the blown plastic containers. If the conveyors were made horizontal the trajectories of various weight containers would vary to a greater degree, and hence necessitate readjustment of the burners, or of the speed of the conveyors, every time containers of a different weight were treated. If the conveyors were positioned more nearly vertical, the containers would not frictionally engage the moving belts, and would not obtain the desired rate of speed, thereby preventing the containers from moving along a uniform trajectory.

As the containers leave the conveyors and move through the circle of high intensity gas flames, their exterior surfaces are impinged by the flames and given the desired characteristics. The speed at which the conveyors move may be varied to permit the containers to remain in contact with the flames for the desired length of time. Containers, which for one reason or another are misaligned when they are discharged from the conveyors, are deflected through the center of the ring of flames by the discharge guide 35. The discharge guide also serves to prevent misaligned containers from being hung up on a burner. After passing through the ring of flames the treated containers fall into the receiver 13 which guides them to the next operation.

It will, of course, be understood that various details of construction may be modified through a wide range without departing from the principles of this invention, and it is not, therefore, the purpose to limit the patent granted hereon otherwise than necessitated by the scope of the appended claims.

We claim:

1. In apparatus for flame treating the exterior surfaces of plastic containers to render such surfaces adherent to coatings, a continuous elongated inclined trough for supporting bottles in a recumbent position, said trough being generally V-shape in cross-section, and means forming at least a part of the trough for moving the containers therealong at a constant rate of speed so as to discharge said containers along a predetermined trajectory, and means at the lower end of the trough providing a ring of flames concentric and normal to a portion of the trajectory.

2. Apparatus as defined in claim 1, the first-named means comprising container contacting surfaces forming a part of the trough walls and means imparting container advancing movement to said surfaces.

3. Apparatus as defined in claim 1, the first-named means comprising a pair of endless belts having opposed reaches providing side walls for said trough, said reaches being substantially parallel to the longitudinal axes of said trough, and means for imparting container advancing movement to said reaches.

4. Apparatus as defined in claim 1, and a plurality of spring-like fingers extending lengthwise of the trough immediately above the path of travel of the containers.

5. Apparatus for flame treating the exterior surfaces of plastic containers and the like comprising, means for conveying said containers in a recumbent position along an inclined path, said means comprising two parallel, inclined endless belt conveyors arranged to form a trough of generally V-shaped cross-section adapted to support and convey said containers in a recumbent position, means for driving said conveyors in unison so as to convey said containers in a downward direction, and means at the lower end of the trough providing a continuous, circular ring of high intensity gas flames, said ring being positioned concentric and normal to the trajectory of the containers as they are discharged by the conveyors.

6. Apparatus for flame treating the exterior surfaces of plastic containers and the like comprising, means for receiving and conveying said containers downwardly along an inclined axis, said conveying means comprising two parallel endless belt conveyors arranged to form a channel of generally V-shaped cross-section to guide recumbent containers along said axis, said channel being generally parallel to said axis, said conveyors also having upper receiving ends and lower discharge ends, means for driving said conveyors at a constant rate of speed, thereby giving said containers a prescribed trajectory as they are discharged from said conveyors, and flame treating means located adjacent the lower discharge end of said conveyors and providing a substantially continuous ring of high intensity gas flames, said ring being concentric and normal to a portion of said trajectory, whereby said containers will pass through the center of the ring as they are discharged from the conveyors.

7. Apparatus as defined in claim 6, wherein said conveyors are disposed at an angle to each other so as to form a V-shaped channel, said conveyors also having drive pulleys at a common end, said drive pulleys being longitudinally offset and having drive shafts carrying gears running in mesh with each other, whereby rotation of one of said shafts will drive both of said conveyors.

8. Apparatus as defined in claim 6, plus a water-cooled guide member positioned intermediate said ring and the discharge end of said conveyors, said member being adapted to position said containers concentric with the axis of the ring when they pass through the latter.

9. Apparatus as defined in claim 6, plus a plurality of spring-like fingers positioned to overlie the path of said containers and adapted to prevent lateral movement of said bottles.

References Cited in the file of this patent

UNITED STATES PATENTS

| | | |
|---|---|---|
| 1,718,654 | Lents et al. | June 25, 1929 |
| 2,583,764 | Buckholdt | Jan. 29, 1952 |
| 2,618,104 | Goodrich | Nov. 18, 1952 |
| 2,648,097 | Kritchever | Aug. 11, 1953 |
| 2,894,139 | Magruder et al. | July 7, 1959 |

FOREIGN PATENTS

| | | |
|---|---|---|
| 1,143,776 | France | Apr. 4, 1957 |